United States Patent
Sharma et al.

(10) Patent No.: US 11,627,130 B2
(45) Date of Patent: Apr. 11, 2023

(54) SYSTEMS AND METHODS FOR CHANGING A SUPPLICANT FROM ONE VIRTUAL LOCAL AREA NETWORK TO ANOTHER USING A CHANGE OF AUTHORIZATION MESSAGE

(71) Applicant: Arista Networks, Inc., Santa Clara, CA (US)

(72) Inventors: Rahul Sharma, Bangalore (IN); Rahul Kumar Singh, Bengaluru (IN); Rajshekhar Biradar, Bangalore (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 114 days.

(21) Appl. No.: 17/178,147

(22) Filed: Feb. 17, 2021

(65) Prior Publication Data
US 2022/0263821 A1 Aug. 18, 2022

(51) Int. Cl.
| | | |
|---|---|---|
| H04L 12/903 | (2013.01) | |
| G06F 21/30 | (2013.01) | |
| H04L 9/40 | (2022.01) | |
| H04L 12/46 | (2006.01) | |
| H04L 12/741 | (2013.01) | |
| H04L 12/757 | (2013.01) | |

(52) U.S. Cl.
CPC ...... H04L 63/0876 (2013.01); H04L 12/4641 (2013.01); H04L 63/029 (2013.01); H04L 63/104 (2013.01)

(58) Field of Classification Search
None
See application file for complete search history.

(56) References Cited

U.S. PATENT DOCUMENTS

| | | | | |
|---|---|---|---|---|
| 7,447,166 B1 * | 11/2008 | Kaluve | ............... | H04L 12/66 370/254 |
| 2004/0255154 A1 * | 12/2004 | Kwan | ............... | H04L 63/08 726/4 |

(Continued)

OTHER PUBLICATIONS

A NATed mobility management scheme for PMIPv4 on wireless LANs. Jia. IEEE. (Year: 2010).*

(Continued)

*Primary Examiner* — Venkat Perungavoor
(74) *Attorney, Agent, or Firm* — Fountainhead Law Group P.C.

(57) ABSTRACT

Systems and methods are provided herein for transitioning a supplicant from one virtual local area network (VLAN) to another using a change of authorization (COA) message. This may be accomplished by an authentication server notifying a network device that a host should be granted access to the network, wherein the authentication server authenticates the host using MAC based authentication. Based on this notification and the MAC address of the host, the network device assigns the host to a first VLAN. If the authentication server determines that the host needs to change from the first VLAN to a second VLAN the authentication server generates a COA message, associated with the host, wherein the COA message comprises a VLAN identifier related to the second VLAN. The authentication server transmits the COA message to the network device causing the network device to route traffic to and from the host using the second VLAN.

20 Claims, 8 Drawing Sheets

(56) References Cited

U.S. PATENT DOCUMENTS

| | | | | |
|---|---|---|---|---|
| 2007/0254677 | A1* | 11/2007 | Venkitaraman | H04W 68/00 |
| | | | | 455/458 |
| 2010/0077447 | A1* | 3/2010 | Dholakia | H04L 9/3226 |
| | | | | 726/3 |
| 2016/0080318 | A1* | 3/2016 | Sood | H04L 67/01 |
| | | | | 709/203 |
| 2017/0373936 | A1* | 12/2017 | Hooda | H04L 41/0816 |
| 2018/0198786 | A1* | 7/2018 | Shah | H04W 12/069 |
| 2020/0112515 | A1* | 4/2020 | Brar | H04L 63/10 |
| 2021/0058388 | A1* | 2/2021 | Knotwell | H04L 63/0823 |
| 2022/0131882 | A1* | 4/2022 | Akella | H04L 63/0876 |
| 2022/0239654 | A1* | 7/2022 | Singhvi | H04L 63/101 |

OTHER PUBLICATIONS

Research on Endpoint Isolation and Remediation Mechanism Based on Trusted Access Technology. Wang. IEEE. (Year: 2008).*

* cited by examiner

| MAC Address | VLAN Assignment |
|---|---|
| 01:01:01:01:01:01 | VLAN 10 |
| 01:01:01:01:01:02 | VLAN 10 |
| 01:01:01:01:01:03 | VLAN 10 |
| . . . . . | . . . . . |
| . . . . . | . . . . . |

| MAC Address | VLAN Assignment |
|---|---|
| 01:01:01:01:01:01 | VLAN 20 |
| 01:01:01:01:01:02 | VLAN 10 |
| 01:01:01:01:01:03 | VLAN 10 |
| . . . . . | . . . . . |
| . . . . . | . . . . . |

SYSTEMS AND METHODS FOR CHANGING A SUPPLICANT FROM ONE VIRTUAL LOCAL AREA NETWORK TO ANOTHER USING A CHANGE OF AUTHORIZATION MESSAGE

BACKGROUND

The present disclosure relates to changing supplicants from one virtual local area network (VLAN) to another and in particular to supplicants that have undergone media access control (MAC) address based authentication (MBA).

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

A supplicant is a host that seeks to access network resources of a computer network. In order to access the network resources, the supplicant must first be authenticated. To be authenticated the supplicant submits a packet (e.g., a dynamic host configuration protocol (DHCP) packet) to an authenticator. An authenticator can be a network device, such as router, switch, etc., that provides a link between the supplicant and the network. Based on the packet received from the supplicant, the authenticator sends an access request to an authentication server such as an authentication, authorization, and accounting (AAA) server. The AAA server processes the requests received from the network device by determining if the credentials submitted with the request are valid for network access. One method used by the AAA server to authenticate devices is MBA. For MBA, the access request sent from the authenticator includes the MAC address of a supplicant, which can be determined by the packet sent from the supplicant. The AAA server determines, based on the submitted MAC address, whether to authenticate the supplicant. If the AAA server authenticates the supplicant, then the supplicant is granted access to the network. Once the supplicant gains access to the network, the supplicant will communicate with the network using one or more network devices (e.g., the authenticator). Network devices can route data packets received from supplicants using VLANs. Network devices can use MAC-based VLAN assignment, which is known in the art, to assign untagged data packets to a VLAN based on the source MAC address of the data packet. Network devices using MAC-based VLAN assignment have one or more forwarding tables (e.g., special-function Ternary content-addressable memories (TCAMs)) with entries associating specific source MAC addresses with VLAN identifiers (VLAN IDs).

In some instances, the AAA administrator may want to change the VLAN that a supplicant is using. For example, the AAA server will quarantine a supplicant if the AAA server determines that the supplicant is compromised, out-of-date, non-compliant with security policies required by the network, etc. To quarantine a supplicant the AAA server restricts network access by changing the supplicant from one VLAN to another, wherein the new VLAN has limited access to the network (e.g., allows the supplicant to access only certain hosts and applications). In another example, the AAA administrator may want to change the VLAN of the supplicant in accordance with a department-wide and/or network-wide VLAN change.

Traditionally, methodologies for changing a supplicant from one VLAN to another interrupt network communications. Networks often use a port bounce feature or disconnect message to cause a supplicant to go through the authentication process again. For example, based on MAC-based VLAN assignment, a network device may be routing data packets from a supplicant using a first VLAN on a first port until the network device receives a port bounce command from the AAA server. The port bounce causes the specified port (e.g., first port) to flap. The port flap command can trigger DHCP renegotiations and/or the authentication process again. Upon successful reauthentication, the network device assigns traffic received from the supplicant to a second VLAN. As the specified port flaps, the supplicant loses access to the network and traffic loss will occur. This is particularly problematic in voice over internet protocol (VOIP) deployments because supplicants used in these deployments require uninterrupted phone traffic to operate without disruptions. For example, a first supplicant may use a second supplicant (e.g., VOIP device with an ongoing call) to route data packets to and from a network device. If the network device uses a port bounce command to cause the first supplicant to reauthenticate and the first and second supplicant use the same port, the second supplicant will experience interrupted phone traffic as the port flaps. Accordingly, current techniques lack an efficient methodology for transitioning a supplicant from one VLAN to another without interrupting network communications.

Various systems and methods described herein address these problems by providing a method for transitioning a supplicant from one VLAN to another using a change of authorization (COA) message and MAC-based VLAN assignment. After the AAA server determines, based on MBA, to grant a supplicant access to the network, the supplicant accesses the network using a network device (e.g., leaf switch) to which it is directly connected. The network device receives data packets from the supplicant and uses MAC-based VLAN assignment to assign the received data packets to a first VLAN. If the AAA server determines that the supplicant needs to be changed to a new VLAN, the AAA server generates a COA message associated with the supplicant. The COA message comprises a VLAN ID corresponding to a second VLAN (the new VLAN). The AAA server transmits the COA message to the network device, causing the network device to update its forwarding table to associate the MAC address of the supplicant with the second VLAN. The update in the forwarding table causes the network device to assign data packets received from the supplicant to the second VLAN. The transition of the supplicant from the first VLAN to the second VLAN allows the supplicant to be successfully moved from a first VLAN to a second VLAN without interrupting network communications.

In some embodiments, a supplicant may not have the ability to detect that a VLAN change has occurred, meaning the supplicant will not renegotiate DHCP parameters by itself. Traffic disruptions can occur for the supplicant until the supplicant renegotiates DHCP parameters in the new VLAN. The DHCP server can be configured to provide a shortened DHCP lease time for the supplicant causing the supplicant to acquire an IP address more often. Accordingly, the supplicant with the shortened DHCP lease time will acquire an IP address in the new VLAN without having to detect the VLAN change. In some embodiments, having a shortened DHCP lease time is not feasible so the network device that forwards packets to and from the supplicant experiencing the VLAN change is configured to avoid traffic disruptions. For example, the network device can be configured to use the old VLAN when forwarding the supplicant's packets until the supplicant has renegotiated DHCP parameters for the new VLAN. When the network device receives the COA message, the network device updates its forwarding table to use the new VLAN for DHCP request packets related to the supplicant and the old VLAN for all other types of packets related to the supplicant. The network device may be further configured to updates its forwarding table to use the new VLAN for all packets related to the supplicant once the supplicant has renegotiated DHCP parameters for the new VLAN.

Figure 1:
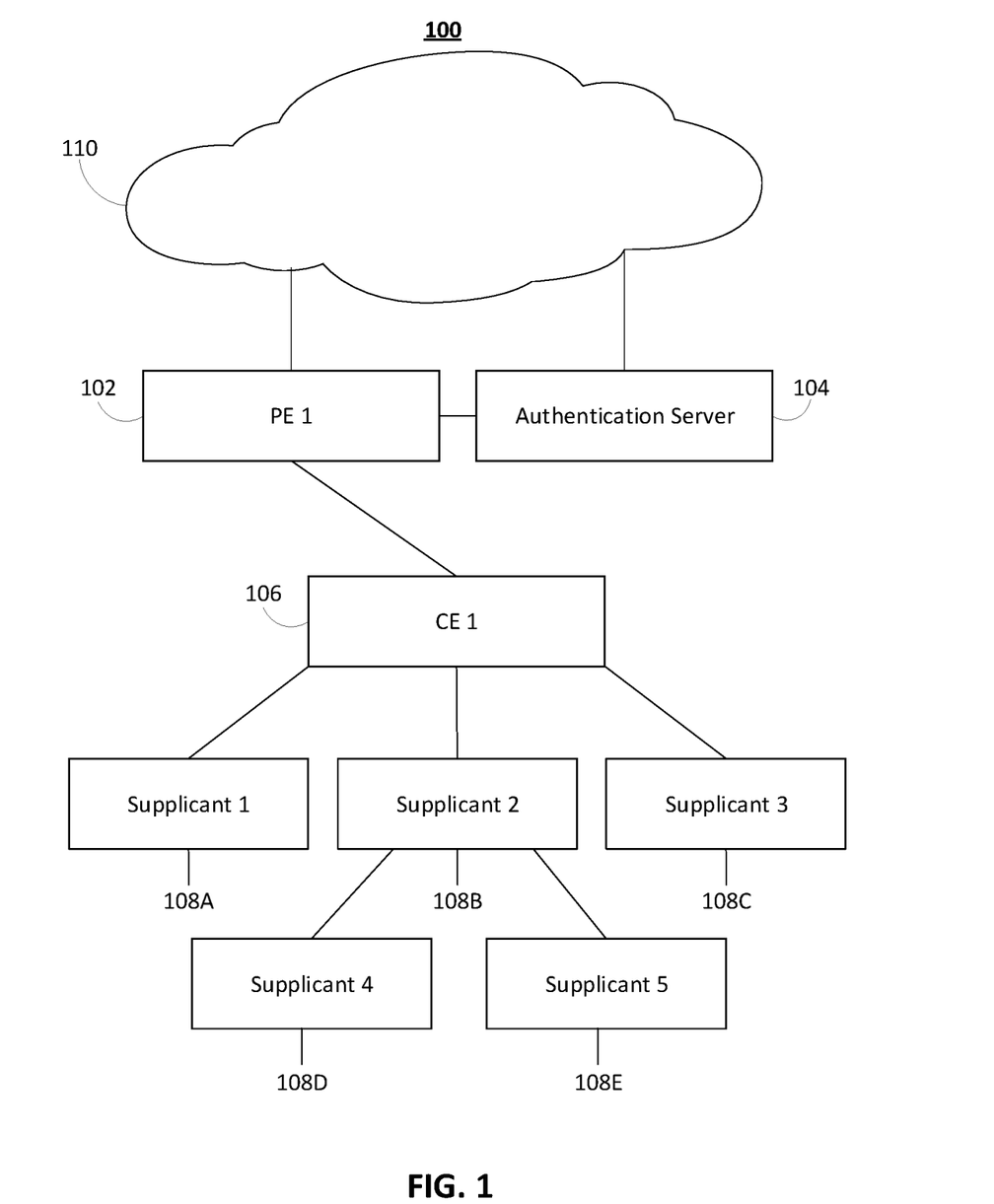
FIG. 1 shows an illustrative network topology of a system for transitioning a supplicant from one VLAN to another using a change of authorization (COA) message, in accordance with some embodiments of the disclosure.

FIG. 1 shows an illustrative network topology of a system 100 for transitioning a supplicant from one VLAN to another using a COA message. System 100 includes devices (e.g., routers, switches, hosts) 102, 104, 106, and 108A-E. In some embodiments, links between devices 102, 104, 106, and 108A-E may be an overlay of virtual links configured over an underlay of physical devices.

System 100 is shown as having a provider edge (PE) device (PE 102) servicing a customer edge (CE) device (CE 106). In some embodiments, PE 102 is eligible to receive network traffic (e.g., network packets) via links across the cloud 110 (e.g., via the backbone of an ethernet virtual private network (EVPN) system, for example, using interconnected servers such as the internet as the undelay) and forward the network traffic to CE 106 using the shown links. In some embodiments, PE 102 is eligible to receive network traffic from CE 106 and forward the network traffic via links across the cloud 110 and/or links to the authentication server 104. System 100 is shown as having five supplicants: supplicant 108A, supplicant 108B, supplicant 108C, supplicant 108D, and supplicant 108E. In some embodiments, a supplicant is a host, (e.g., laptop, desktop, smartphone, etc.) that seeks to access network resources of a computer network. In order to access the network resources, the supplicant must first be authenticated. In some embodiments, CE 106 is an authenticator that provides a link between the supplicants (supplicant 108A, supplicant 108B, supplicant 108C, supplicant 108D, and supplicant 108E) and the network and can allow or block network traffic between the supplicants and the network. One skilled in the art would understand that the same techniques described herein may be used by a system in similar network topologies containing any suitable number of devices.

In an embodiment, supplicant 108A requests access to the network by submitting a packet (e.g., a dynamic host configuration protocol (DHCP) packet) to the authenticator (CE 106). Based on the packet received from supplicant 108A, CE 106 forwards an access request to an authentication server (e.g., authentication server 104) using PE 102. In some embodiments, CE 106 may have a direct link to the authentication server 104. In some embodiments, the authentication server 104 is an authentication, authorization, and accounting (AAA) server. The access request comprises credentials (e.g., MAC address, password, digital certificate, etc.) related to the supplicant. In some embodiments, the required credentials are specified by a network administrator. In some embodiments, the supplicant is incapable of using extensible authentication protocol (EAP) over local area network (LAN) (EAPOL).

The authentication server 104 processes the access requests received from CE 106 by determining if the credentials submitted with the request are valid for network access. In some embodiments, the authentication server 104 uses MBA to authenticate the request. For MBA, the access request sent from CE 106 includes the MAC address of supplicant 108A which can be determined by the packet sent by supplicant 108A. The authentication server 104 determines, based on the MAC address, whether to authenticate supplicant 108A. In some embodiments, the authentication server 104 compares the MAC address of supplicant 108A to a database of acceptable MAC addresses. If the authentication server 104 determines that the MAC address is acceptable, it sends an authorization message to CE 106. Based on the authorization message, CE 106 allows supplicant 108A access to the network. If the authentication server 104 determines that the MAC address is not acceptable, it sends a failure message to CE 106. Based on the failure message, CE 106 does not allow supplicant 108A access to the network.

Once supplicant 108A gains access to the network, supplicant 108A will communicate with the network using CE 106. CE 106 routes data packets received from supplicants using a first VLAN. In some embodiments, CE 106 uses MAC based VLAN assignment to assign untagged data packets received from supplicant 108A to the first VLAN-based on the source MAC address of the data packet. In some embodiments, forwarding packets based on the MAC addresses of the packet requires setting up groups of MAC addresses and then mapping these groups to VLANs. In some embodiments, CE 106 comprises one or more forwarding tables (e.g., special-function TCAMs) with entries associating specific source MAC addresses with VLAN IDs that correspond to VLANs. In some embodiments, one or more forwarding tables map MAC addresses to VLANs on a per-interface basis. In some embodiments, one or more forwarding tables have one or more MAC based VLAN groups defined, wherein each group contains different MAC addresses. For example, the MAC addresses for supplicant 108A, supplicant 108B, supplicant 108C, supplicant 108D, and supplicant 108E can be mapped to a first VLAN group corresponding to the first VLAN. When CE 106 receives a data packet, if the source MAC address of the data packet corresponds to supplicant 108A, supplicant 108B, supplicant 108C, supplicant 108D, and supplicant 108E, then CE 106 will forward the data packet using the first VLAN. In some embodiments, MAC-based VLAN groups can be assigned to specific ports or link aggregation groups (LAGs) on CE 106.

In some embodiments, the authentication server 104 determines that supplicant 108A needs to change from the first VLAN to a second VLAN. In some embodiments, this determination is based on detection software and/or input received from a network administrator. In some embodiments, the authentication server 104 may determine that supplicant 108A needs to be quarantined to a second VLAN (with limited access to the network) because supplicant 108A is compromised, out-of-date, non-compliant with security policies required by the network, etc. In another example, the authentication server can determine that supplicant 108A needs to move to a second VLAN in accordance with a department-wide and/or network-wide VLAN change.

In some embodiments, if the authentication server 104 determines that supplicant 108A needs to be changed from the first VLAN to a second VLAN, the authentication server 104 generates a COA message associated with supplicant 108A. The COA message comprises a VLAN ID corresponding to the second VLAN (the new VLAN). The authentication server 104 transmits the COA message to CE 106 via PE 102. In some embodiments, when CE 106 receives the COA message, CE 106 updates one or more entries associated with the MAC address of supplicant 108A in its forwarding table. For example, if CE 106's forwarding table comprises an entry mapping the MAC address of supplicant 108A to the first VLAN, CE 106 updates the entry to map the MAC address of supplicant 108A to the second VLAN in accordance with the COA message. The update in the forwarding table causes CE 106 to forward data packets, received from supplicant 108A, using the second VLAN instead of the first VLAN. Accordingly, supplicant 108A changes from the first VLAN to the second VLAN without reauthentication or port flapping, allowing a non-disruptive VLAN change.

In some embodiments, supplicant 108B is a VOIP device and supplicants 108D and 108E are non-VOIP devices that send and receive data packets to CE 106 via supplicant 108B. In some embodiments, when the authentication server 104 determines that supplicant 108D needs to be changed from the first VLAN to the second VLAN, the authentication server 104 generates a COA message associated with supplicant 108D. The COA message comprises a VLAN ID corresponding to the second VLAN. The authentication server 104 transmits the COA message to CE 106 via PE 102. In some embodiments, when CE 106 receives the COA message, CE 106 updates one or more entries associated with the MAC address of supplicant 108D in its forwarding table. For example, if CE 106's forwarding table comprises an entry mapping the MAC address of supplicant 108D to the first VLAN, CE 106 updates the entry to map the MAC address of supplicant 108D to the second VLAN in accordance with the COA message. The update in the forwarding table causes CE 106 to forward data packets, received from supplicant 108D, using the second VLAN instead of the first VLAN. Accordingly, supplicant 108D changes from the first VLAN to the second VLAN without reauthentication or port flapping, allowing uninterrupted VOIP traffic for supplicant 108B.

In some embodiments, system 100 comprises different DHCP servers for different VLANs. For example, the first VLAN may use a first DHCP server and the second VLAN may use a second DHCP server. In some embodiments, supplicant 108A may not have the ability to detect that CE 106 switched supplicant 108A from a first VLAN to a second VLAN, meaning the supplicant will not renegotiate DHCP parameters by itself. Supplicant 108A will not be able to send or receive network packets without renegotiating DHCP parameters with the second DHCP server because the original DHCP parameters (e.g., IP address from the first DHCP server) are outdated. In some embodiments, all DHCP servers for all the different VLANs of system 100 are configured to provide shortened DHCP lease times for supplicants 108A-E. In some embodiments, the shortened lease time causes supplicants 108A-E to renegotiate DHCP parameters (e.g., acquire fresh IP addresses) more often. For example, the first DHCP server provides supplicant 108A with a shortened DHCP lease time, causing supplicant 108A to acquire an IP address more often. In accordance with the shortened lease time, whenever the lease time expires, supplicant 108A renegotiates the DHCP parameters. Before supplicant 108A switches from the first VLAN to the second VLAN, whenever the lease time expires, supplicant 108A renegotiates the DHCP parameters with the first DHCP server because supplicant 108A is using the first VLAN. After supplicant 108A switches from the first VLAN to the second VLAN, when the DHCP lease time expires, supplicant 108A will acquire a new IP address from the second DHCP server because supplicant 108A is now using the second VLAN. With the shortened DHCP lease time, supplicant 108A acquires an IP address in the second VLAN without detecting that supplicant 108A has switched to the second VLAN. In some embodiments, system 100 comprises a DHCP server across all available VLANs. In such a system, the shortened DHCP lease time may not be required because the DHCP parameters before and after the VLAN change may be similar or the same.

Figure 2A:
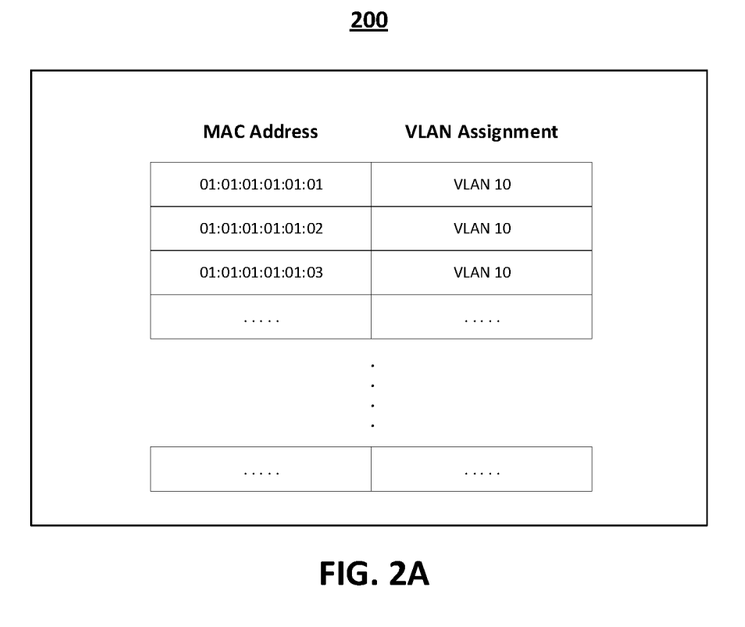
FIG. 2A shows an illustrative forwarding table for transitioning a supplicant from one VLAN to another using a COA message, in accordance with some embodiments of the disclosure.

FIG. 2A shows an illustrative forwarding table 200 for transitioning a supplicant from one VLAN to another using a COA message, in accordance with some embodiments of the disclosure. Table 200 includes MAC addresses mapped to VLAN identifiers, wherein the VLAN identifiers correspond to VLANs. When an incoming packet has a source or destination MAC address match, it is assigned to the corresponding VLAN. For example, if a network device (e.g., CE 106) receives a packet with a source MAC address of 01:01:01:01:01:01 (supplicant 108A's MAC address), the network device will use table 200 to determine that the packet should be forwarded using VLAN 10. Table 200 may be a stand-alone table or a component of a larger lookup table, for example, a forwarding information base residing in RAM or in a combination of RAM and a dedicated table memory (e.g., CAM/TCAM/special-function TCAMs). Table 200 is just one embodiment used to display an illustrative forwarding table for transitioning a supplicant from one VLAN to another using a COA message; similar storage formats, methods, and information can be used. For example, additional information or less information may be stored in table 200. In particular, table 200 may have been configured by CE 106 where the MAC addresses relate to supplicants 108A-E.

In some embodiments, the VLANs are assigned based on the MAC address of the device. In some embodiments, MAC based VLAN assignment requires setting up groups of MAC addresses and then mapping these groups to VLANs. In some embodiments, these devices are grouped by classification. For example, devices that are identified as telephones using LLDP packets may need to be assigned to a specific VLAN. In another example, devices are grouped according to security. Devices that are trusted may be assigned to a first VLAN with full access to the network while devices that are not fully trusted are restricted to a second VLAN with limited network access (e.g., that allows the devices to access only certain hosts and applications). In some embodiments, lookups in table 200 are performed to confirm, deny, or advance packet processing tasks. These tasks may include, for example, allowing or dropping the packet, applying a rate limiter to the packet, applying a quality of service policy to the packet, mirroring the packet, counting the packet, logging the packet, selecting an output interface for the packet, implementing further analysis of the packet, and/or similar such tasks.

Figure 2B:
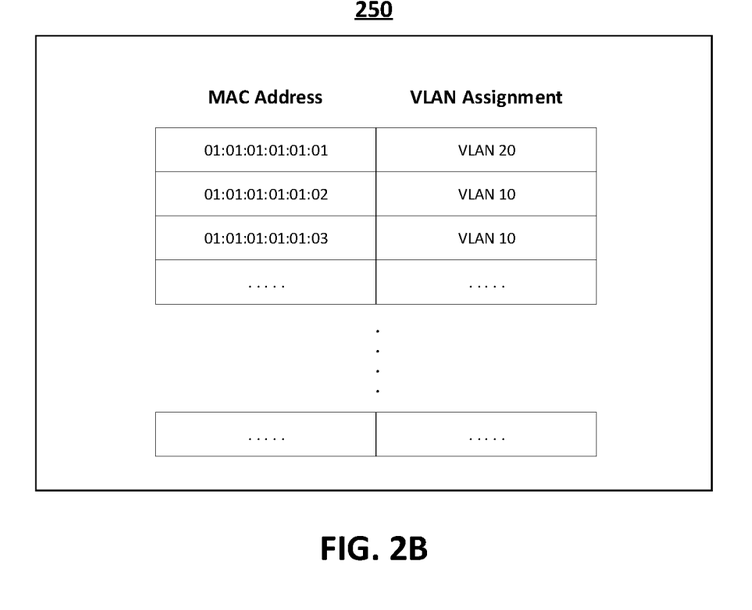
FIG. 2B shows another illustrative forwarding table for transitioning a supplicant from one VLAN to another using a COA message, in accordance with some embodiments of the disclosure.

FIG. 2B shows another illustrative forwarding table 250 for transitioning a supplicant from one VLAN to another using a COA message, in accordance with some embodiments of the disclosure. In particular, table 250 may have been configured by CE 106 after CE 106 received the COA message from authentication server 104. In some embodiments, CE 106 creates table 250 by modifying table 200 in response to receiving the COA message from authentication server 104.

In some embodiments, CE 106 receives the COA message from authentication server 104, wherein the COA message indicates a device (e.g., supplicant 108A) and a VLAN ID corresponding to a second VLAN (the new VLAN). In response to receiving the COA message, CE 106 may modify table 250 to update the VLAN ID associated with the MAC address (01:01:01:01:01:01) of supplicant 108A from VLAN 10 (the first VLAN) to VLAN 20 (the second VLAN). Accordingly, when an incoming packet has a source or destination MAC address match, it is assigned to the corresponding VLAN in the updated table 250. For example, if a network device (e.g., CE 106) receives a packet with a source MAC address of 01:01:01:01:01:01 (supplicant 108A's MAC address), the network device will use table 250 to determine that the packet should be forwarded using VLAN 20. In some embodiments, in response to receiving the COA message, CE 106 may modify table 250 to update the VLAN ID associated with the MAC address (01:01:01:01:01:01) of supplicant 108A based on the type of packet. For example, CE 106 may modify table 250 so that DHCP request packets associated with the MAC address (01:01:01:01:01:01) of supplicant 108A will be forwarded using VLAN 20 (the new VLAN) but all other types of packets associated with the MAC address (01:01:01:01:01:01) of supplicant 108A will be forwarded using VLAN 10 (the old VLAN). After supplicant 108A renegotiates DHCP parameters with a DHCP server of VLAN 20, the CE 106 may further modify table 250 so all types of packets associated with the MAC address (01:01:01:01:01:01) of supplicant 108A will be forwarded using VLAN 20.

Figure 3:
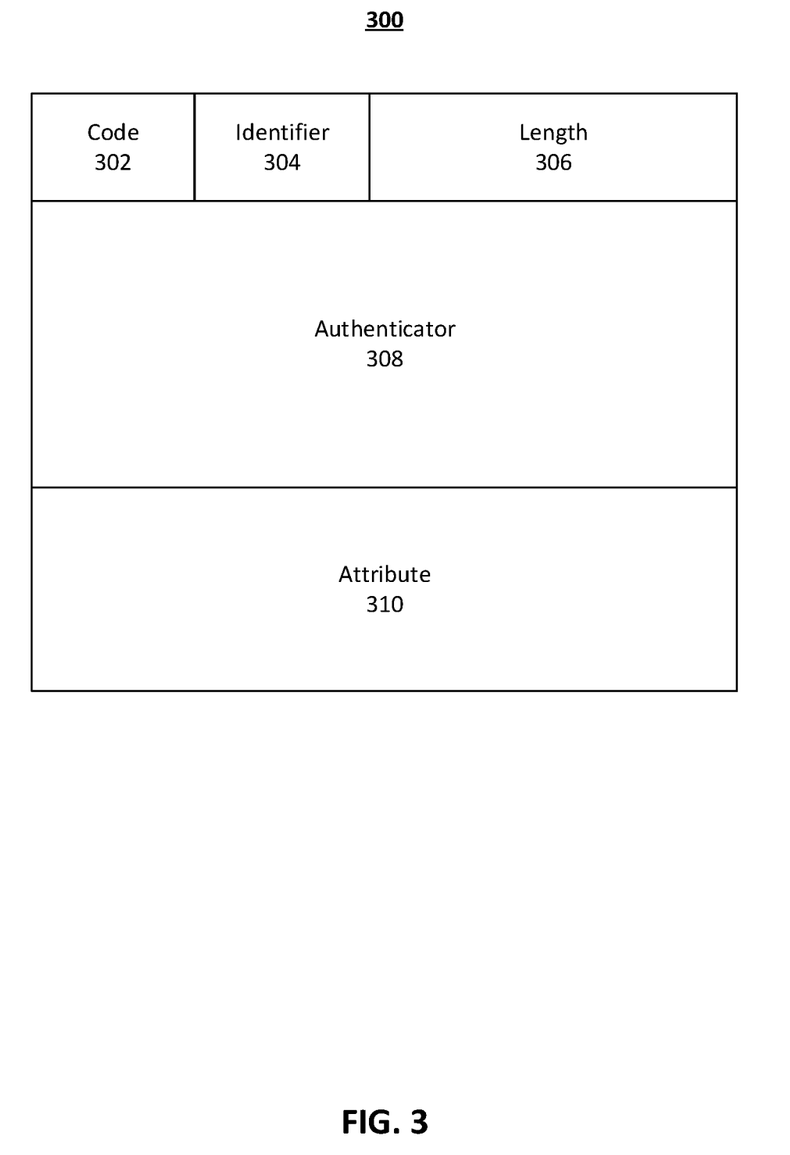
FIG. 3 shows an illustrative network packet of a COA message for transitioning a supplicant from one VLAN to another, in accordance with some embodiments of the disclosure.

FIG. 3 shows an illustrative network packet 300 of a COA message for transitioning a supplicant from one VLAN to another, in accordance with some embodiments of the disclosure. In some embodiments, a COA message packet format comprises a code field 302, an identifier field 304, a length field 306, an authenticator field 308, and an attribute field 310. In some embodiments, the fields are in type-length-value (TLV) format.

In some embodiments, the code field 302 identifies the type of COA packet 300 (e.g., COA request packet, COA acknowledgment packet, COA negative acknowledgment packet, etc.). In some embodiments, when a packet is received with an invalid code field 302, the packet is discarded. In some embodiments, the identifier field 304 aids in matching COA requests and replies. In some embodiments, the length field 306 indicates the length of the COA packet 300 including the code field 302, identifier field 304, length field 306, authenticator field 308, and an attribute field 310. In some embodiments, data outside the range indicated by the length field 306 is treated as padding data and is ignored on reception. In some embodiments, if the received packet is shorter than the range indicated by the length field 306, the packet is discarded. In some embodiments, the authenticator field 308 is used to authenticate the COA packet 300. For example, the authenticator field can be generated using a shared secret such as a hash value.

In some embodiments, the attribute field 310 is variable in length, and contains a list of attributes, as well as any desired optional attributes. In some embodiments, the attribute field 310 comprises a tunnel-private-group-ID. The tunnel-private-group-ID can identify a device (e.g., supplicant) and VLAN information (e.g., a second VLAN ID). In some embodiments, the tunnel- private-group-ID indicates that supplicant 108A should change from a first VLAN to the second VLAN. In some embodiments, a first device (e.g., CE 106) comprises one or more entries associated with a second device (e.g., supplicant 108A) in its forwarding table wherein the one or more entries map the second device to the first VLAN. Upon receipt of the COA message, the first device updates the one or more entries associated with the second device to map the second device to the second VLAN in accordance with the COA message.

Figure 4:
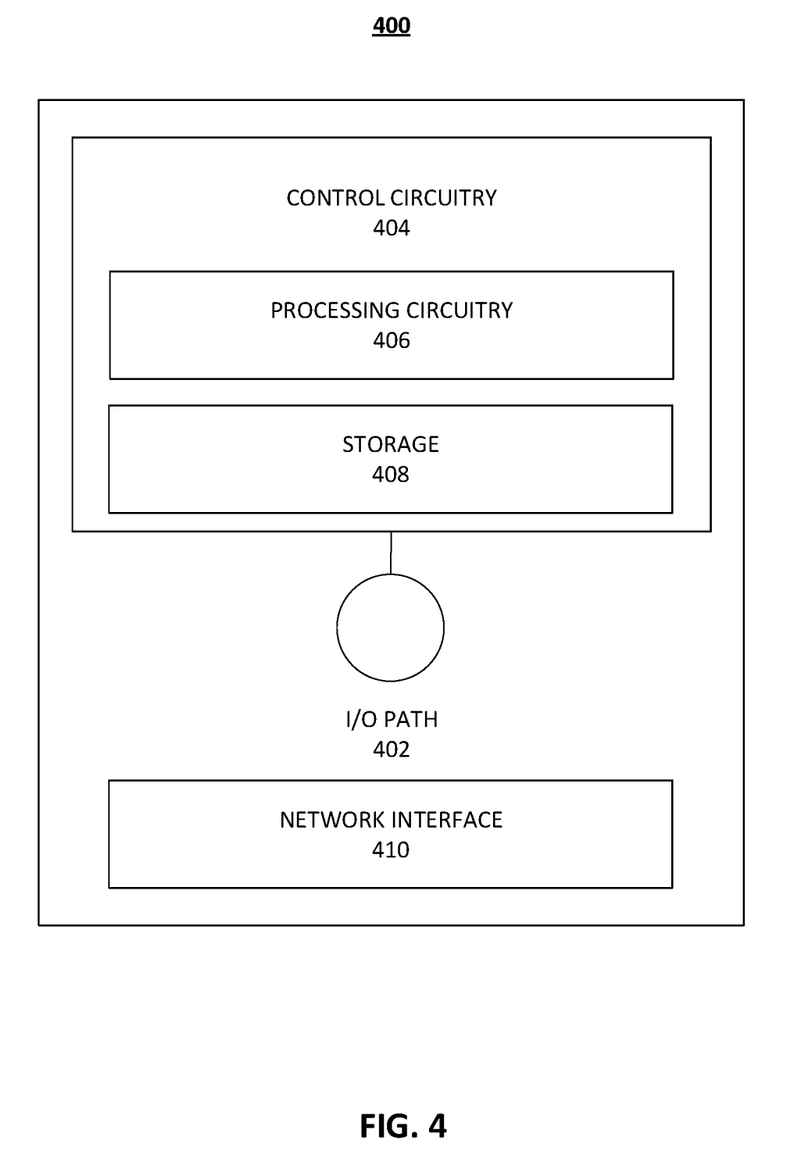
FIG. 4 shows a diagram of an illustrative network device for transitioning a supplicant from one VLAN to another, in accordance with some embodiments of the disclosure.

FIG. 4 shows a diagram of an illustrative network device for transitioning a supplicant from one VLAN to another, in accordance with some embodiments of the disclosure. In particular, a device 400 of FIG. 4 may be any of the devices depicted in FIG. 1 (e.g., devices 102, 104, 106, and 108A-E) or may be a physical or virtual device hosting any of physical or virtual devices 102, 104, 106, and 108A-E. Device 400 may be a router, an L3 switch, an L2 router, or a host, and/or any other computing device that may be configured to participate in EVPN switching or routing. Device 400 may receive data via data network interface 410 and provide the received data to control circuitry 404 via an input/output (I/O) path 402. Control circuitry 404 includes processing circuitry 406 and memory 408. Memory 408 may include volatile memory (such as random-access memory (RAM), for example, static RAM and/or dynamic RAM), which does not retain its contents when power is turned off, and non-volatile memory (such as, for example, a solid state drive (SSD), a hard disk drive (HDD), electrically erasable programmable read-only memory (EEPROM), etc.), which does retain its contents when power is turned off. Control circuitry 404 may send and receive commands, requests, and other suitable data using I/O path 402. As noted above, I/O path 402 connects control circuitry 404 (and specifically processing circuitry 406) to network interface 410, which in turn connects device 400 to one or more other devices. For example, I/O path 402 may provide route packets to next hops listed in a forwarding table.

Control circuitry 404 may be based on any suitable processing circuitry, such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 404 executes instructions suitable to implement any of the techniques described above or below.

Memory 408 may be an electronic storage device that is part of control circuitry 404. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. In some embodiments, memory 408 may include a table used for forwarding data packets. Multiple circuits may be provided to handle simultaneous processing functions. In some embodiments, device 400 may be a virtual device, wherein components 404, 406, 408, 402 and 410 are virtualized on top of another physical device. In some embodiments, storage 408 may include forwarding tables (e.g., special-function TCAMs) with entries associating specific source MAC addresses with VLAN identifiers (VLAN IDs).

Figure 5:
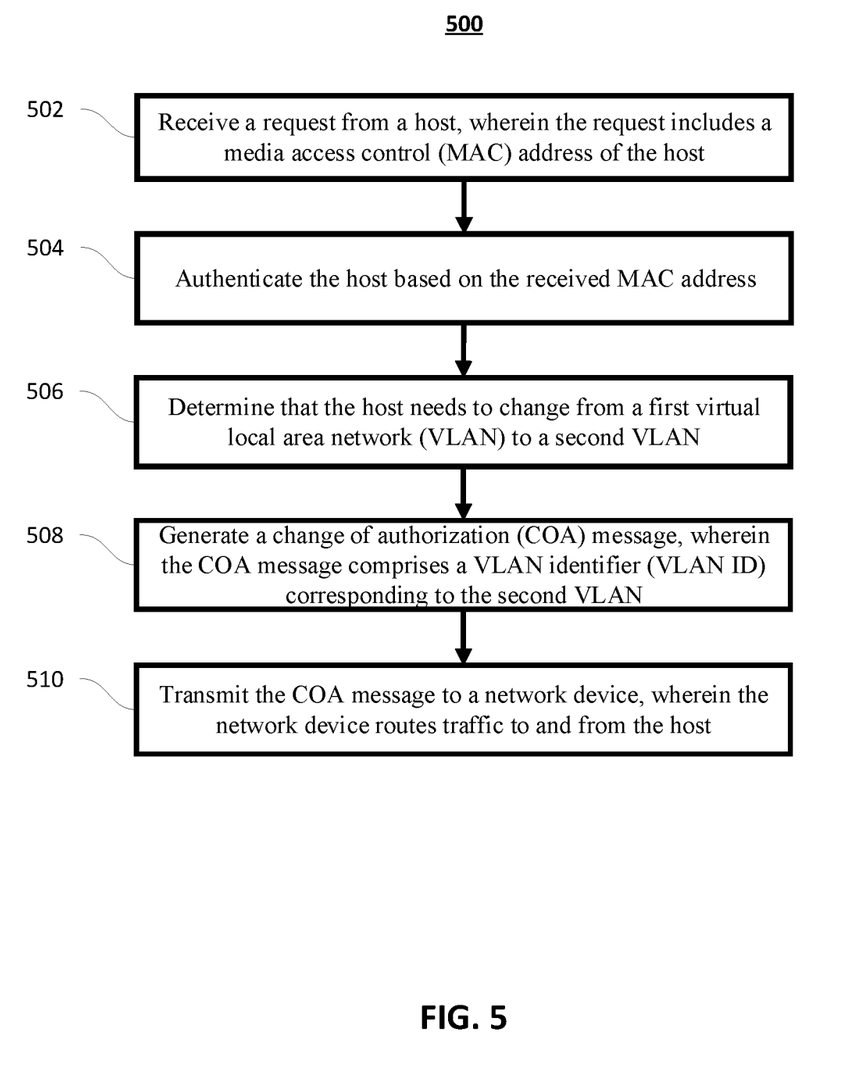
FIG. 5 is a flowchart of an illustrative process for transitioning a supplicant from one VLAN to another using a COA message, in accordance with some embodiments of the disclosure.

FIG. 5 is a flowchart of a detailed illustrative process for transitioning a supplicant from one VLAN to another using a COA message, in accordance with some embodiments of the present disclosure. Process 500 may be performed by physical or virtual control circuitry, such as control circuitry 404 of device 400 (FIG. 4). For example, process 500 may be performed by control circuitries of an authentication server (e.g., authentication server 104). In some embodiments, some steps of process 500 may be performed by one of several devices.

At step 502, control circuitry receives a request from a host, wherein the request includes the MAC address of the host. In some embodiments, the host sends the request to the control circuitry via an authenticator. In some embodiments, the authenticator can process and/or change the request before forwarding it to the control circuitry. The access request comprises the MAC address of the host. In some embodiments, the request comprises additional credentials (e.g., password, digital certificate, etc.) related to the host. In some embodiments, the host submits the credentials according to required credentials designated by a network administrator. In some embodiments, the host is incapable of using extensible authentication protocol (EAP) over a local area network (LAN) (EAPOL).

At step 504, control circuitry authenticates the host based on the MAC address of the host. In some embodiments, the control circuitry determines if the MAC address is valid for network access using MBA. For example, the control circuitry compares the submitted MAC address to a database of acceptable MAC addresses. If the control circuitry determines that the MAC address is acceptable, it sends an authorization message allowing the host access to the network. In some embodiments, the control circuitry transmits the authorization message to the authenticator and the authenticator provides network access to the host.

At step 506, control circuitry determines that the host needs to change from a first VLAN to a second VLAN. In some embodiments, the control circuitry uses detection software and/or input received from a network administrator to make the determination. In some embodiments, the control circuitry determines that the host needs to move to the second VLAN in accordance with a department-wide and/or network-wide VLAN change for all devices of a certain type. In some embodiments, the control circuitry determines that the host needs to be quarantined to the second VLAN (with limited access to the network) because the host is compromised, out-of-date, non-compliant with security policies required by the network, etc.

At step 508, control circuitry generates a COA message wherein the COA message comprises a VLAN ID corresponding to the second VLAN. In some embodiments, the COA message is the COA packet 300 of FIG. 3. In some embodiments, the COA message comprises a tunnel-private-group-ID, wherein the tunnel-private-group-ID indicates the host and a VLAN ID corresponding to the second VLAN. In some embodiments, the tunnel-private-group-ID indicates that supplicant 108A should change from a first VLAN to the second VLAN. In some embodiments, a first device (e.g., CE 106) comprises one or more entries associated with a second device (e.g., supplicant 108A) in its forwarding table wherein the one or more entries map the second device to the first VLAN. Upon receipt of the COA message, the first device updates the one or more entries associated with the second device to map the second device to the second VLAN in accordance with the COA message.

At step 510, control circuitry transmits the COA message to the network device that routes traffic to and from the host. In some embodiments, the network device comprises one or more entries associated with the host in its forwarding table wherein the one or more entries map the host to the first VLAN. Upon receipt of the COA message, the network device updates the one or more entries associated with the host to map the host to the second VLAN in accordance with the COA message.

Figure 6:
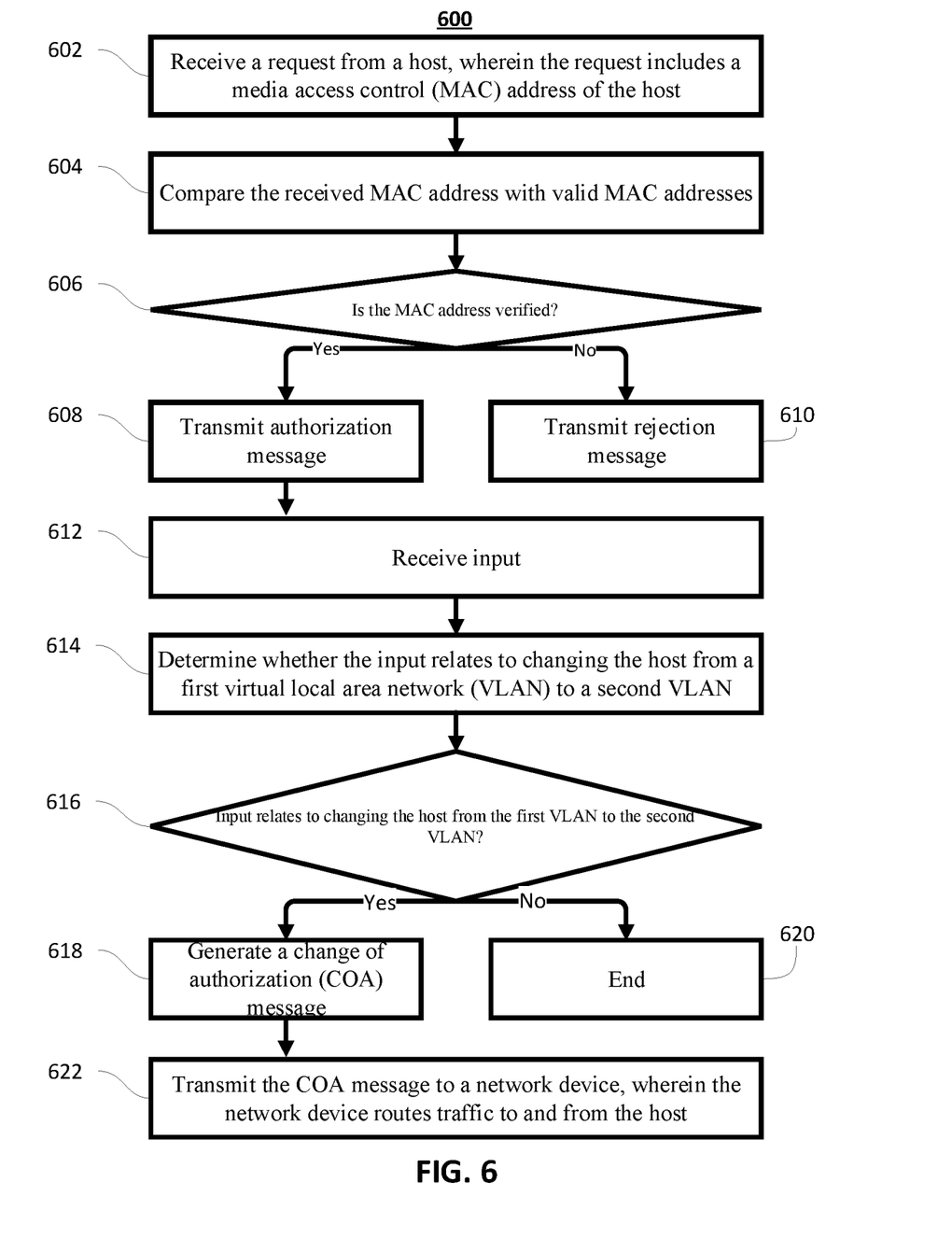
FIG. 6 is another flowchart of an illustrative process for transitioning a supplicant from one VLAN to another using a COA message, in accordance with some embodiments of the disclosure.

FIG. 6 is a flowchart of a detailed illustrative process for transitioning a supplicant from one VLAN to another using a COA message, in accordance with some embodiments of the present disclosure. In some embodiments, FIG. 6 comprises similar or the same steps as FIG. 5. In some embodiments, FIG. 6 describes specific implementations of one, some, or all of the steps described in FIG. 5. Process 600 may be performed by physical or virtual control circuitry, such as control circuitry 404 of device 400 (FIG. 4). For example, process 600 may be performed by control circuitries of an authentication server (e.g., authentication server 104). In some embodiments, some steps of process 600 may be performed by one of several devices.

At step 602, control circuitry receives a request from a host, wherein the request includes the MAC address of the host. In some embodiments, the host sends the request to the control circuitry via an authenticator. In some embodiments, the authenticator can process and/or change the request before forwarding it to the control circuitry. The access request comprises the MAC address of the host. In some embodiments, the request comprises additional credentials (e.g., password, digital certificate, etc.) related to the host. In some embodiments, the host submits the credentials according to required credentials designated by a network administrator. In some embodiments, the host is incapable of using extensible authentication protocol (EAP) over local area network (LAN) (EAPOL).

At step 604, control circuitry compares the MAC address received from the request to a database of valid MAC addresses. For example, the control circuitry determines if the MAC address corresponds to an entry in the database of valid MAC addresses. In some embodiments, the database is located in storage 408, which is part of control circuitry 404 and is maintained by control circuitry 404. In some embodiments, the database is manually entered by a network administrator.

At step 606, control circuitry determines if the MAC address received from the request is verified by determining if the MAC address corresponds to an entry in the database, wherein the entry allows authorization. If the received MAC address corresponds to an entry in the database wherein the entry allows authorization, the process 600 continues to step 608. If the received MAC address does not correspond to an entry in the database wherein the entry allows authorization, the process 600 continues to step 610.

At step 608, control circuitry transmits an authorization message to the authenticator. In some embodiments, the authorization message indicates that the host is authorized to access the network. In some embodiments, the control circuitry transmits the authorization message to the authenticator and the authenticator provides network access to the host.

At step 610, control circuitry transmits a rejection message to the authenticator. In some embodiments, the rejection message indicates that the host is not authorized to access the network. In some embodiments, the control circuitry transmits the rejection message to the authenticator and the authenticator does not allow network access to the host.

At step 612, control circuitry receives an input. In some embodiments, the input is received from a network administrator. For example, the network administrator may indicate that one or more devices and/or all devices of a certain type should be changed from a first VLAN to a second VLAN. In some embodiments, the control circuitry uses detection software that can provide an input to the control circuitry. For example, the detection software may receive information indicating one or more conditions related to a host, wherein the conditions result in an input being sent to the control circuitry. In some embodiments, the one or more conditions may be that a host is compromised, out-of-date, non-compliant with security policies required by the network, etc.

At step 614, control circuitry determines whether the input relates to changing a host from a first VLAN to a second VLAN. For example, the control circuitry determines if the input corresponds to an entry in a database, wherein the entries map inputs to actions. In some embodiments, certain inputs relate to changing a host from a first VLAN to a second VLAN. In some embodiments, the database is located in storage 408, which is part of control circuitry 404 and is maintained by control circuitry 404. In some embodiments, the database is manually entered by a network administrator.

At step 616, control circuitry determines if the received input relates to changing the host from the first VLAN to the second VLAN. If the received input corresponds to an entry in the database mapping the input to changing the host from the first VLAN to the second VLAN, the process 600 continues to step 618. If the received input does not correspond to an entry in the database mapping the input to changing the host from the first VLAN to the second VLAN, the process 600 continues to step 620 where the process 600 ends.

At step 618, control circuitry generates a COA message. In some embodiments, the COA message comprises a VLAN ID corresponding to the second VLAN. In some embodiments, the second VLAN is indicated in the database of step 616. In some embodiments, the second VLAN is selected by a network administrator. In some embodiments, the COA message is the COA packet 300 of FIG. 3. In some embodiments, the COA message comprises a tunnel-private-group-ID, wherein the tunnel-private-group-ID indicates the host and a VLAN ID corresponding to the second VLAN.

At step 622, control circuitry transmits the COA message to the network device that routes traffic to and from the host. In some embodiments, the network device comprises one or more entries associated with the host in its forwarding table wherein the one or more entries map the host to the first VLAN. Upon receipt of the COA message, the network device updates the one or more entries associated with the host to map the host to the second VLAN in accordance with the COA message. In some embodiments, the network device is also the authenticator that provides network access to the host.

Figure 7:
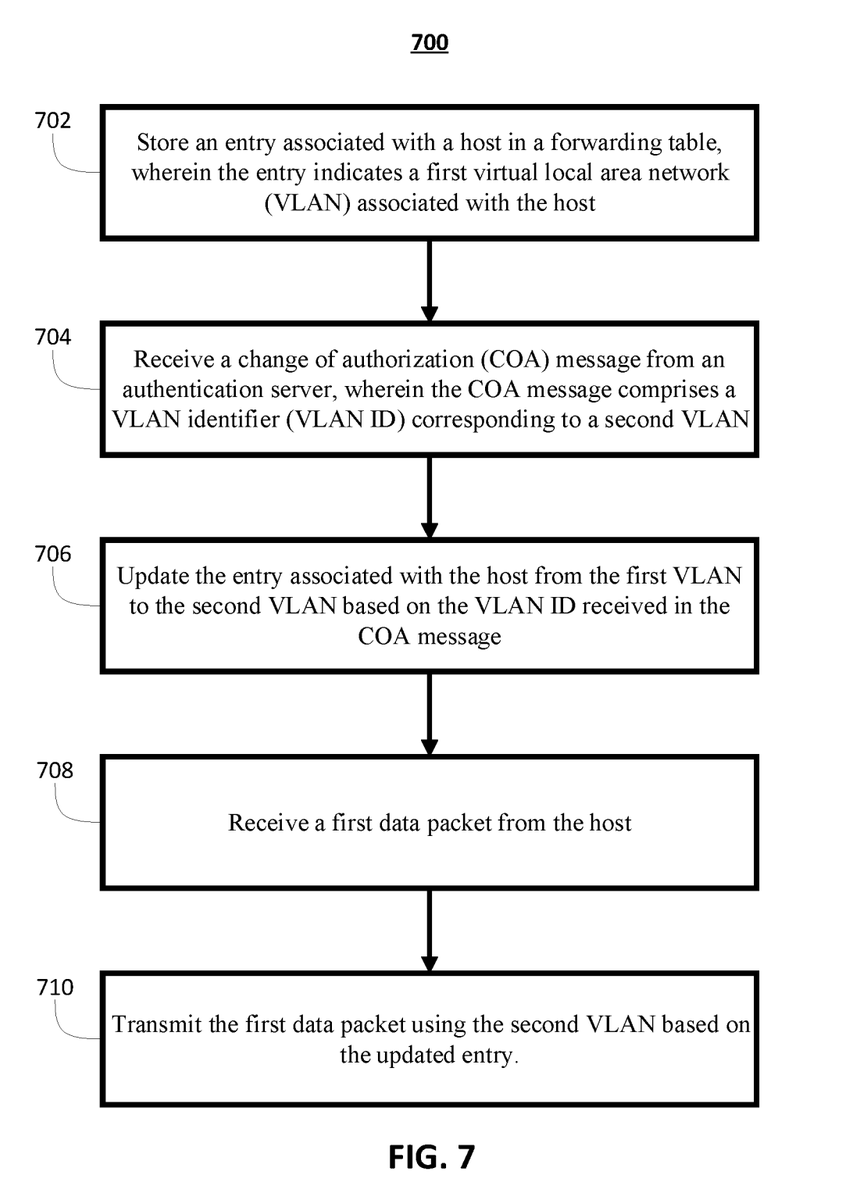
FIG. 7 is another flowchart of an illustrative process for transitioning a supplicant from one VLAN to another using a COA message, in accordance with some embodiments of the disclosure.

FIG. 7 is a flowchart of a detailed illustrative process for transitioning a supplicant from one VLAN to another using a COA message, in accordance with some embodiments of the present disclosure. Process 700 may be performed by physical or virtual control circuitry, such as control circuitry 404 of device 400 (FIG. 4). For example, process 700 may be performed by control circuitries of a customer edge device and/or a provider edge device (e.g., PE 102 and/or CE 106). In some embodiments, some steps of process 700 may be performed by one of several devices.

At step 702, control circuitry stores an entry associated with a host in a forwarding table. In some embodiments, the forwarding table comprises table 200 of FIG. 2. In some embodiments, the entry associates the MAC address of the host with a VLAN ID, wherein the VLAN ID corresponds to a first VLAN. In some embodiments, the forwarding table (e.g., special-function TCAMs) has entries associating MAC addresses corresponding to one or more host with VLAN IDs. In some embodiments, the control circuitry uses MAC-based VLAN assignment to route data packets received from the host according to one or more entries in the forwarding table. For example, upon receiving a data packet from the host, the control circuitry determines the source MAC address of the data packet. The control circuitry then uses the source MAC address to find an entry in the forwarding table mapping the source MAC address to a first VLAN. The control circuitry then forwards the received data packets using the VLAN (first VLAN) corresponding to the source MAC address.

At step 704, control circuitry receives a COA message from an authentication server. In some embodiments, the COA message is the COA packet 300 of FIG. 3. In some embodiments, the COA message comprises a tunnel-private-group-ID, wherein the tunnel-private-group-ID indicates the host and a VLAN ID corresponding to a VLAN. In some embodiments, the COA message comprises a VLAN ID corresponding to a second VLAN, wherein the second VLAN is different from the VLAN indicated in the entry associated with the host in step 702.

At step 706, control circuitry updates the entry associated with host from step 702. The control circuitry updates the entry in the forwarding table to map the MAC address of the host from the first VLAN to the second VLAN (the new VLAN) in accordance with the received COA message.

At step 708, control circuitry receives a first data packet from the host. In some embodiments, the data packet is untagged, and the control circuitry uses MAC-based VLAN assignment to assign the untagged data packet to a VLAN based on the source MAC address of the data packet. The control circuitry determines the source MAC address of the data packet and determines an entry in the forwarding table mapping the source MAC address to a VLAN. The updated entry maps the MAC address of the host to the second VLAN in accordance with the received COA message. At step 710, control circuitry transmits the first data packet using the second VLAN based on the updated entry.

Figure 8:
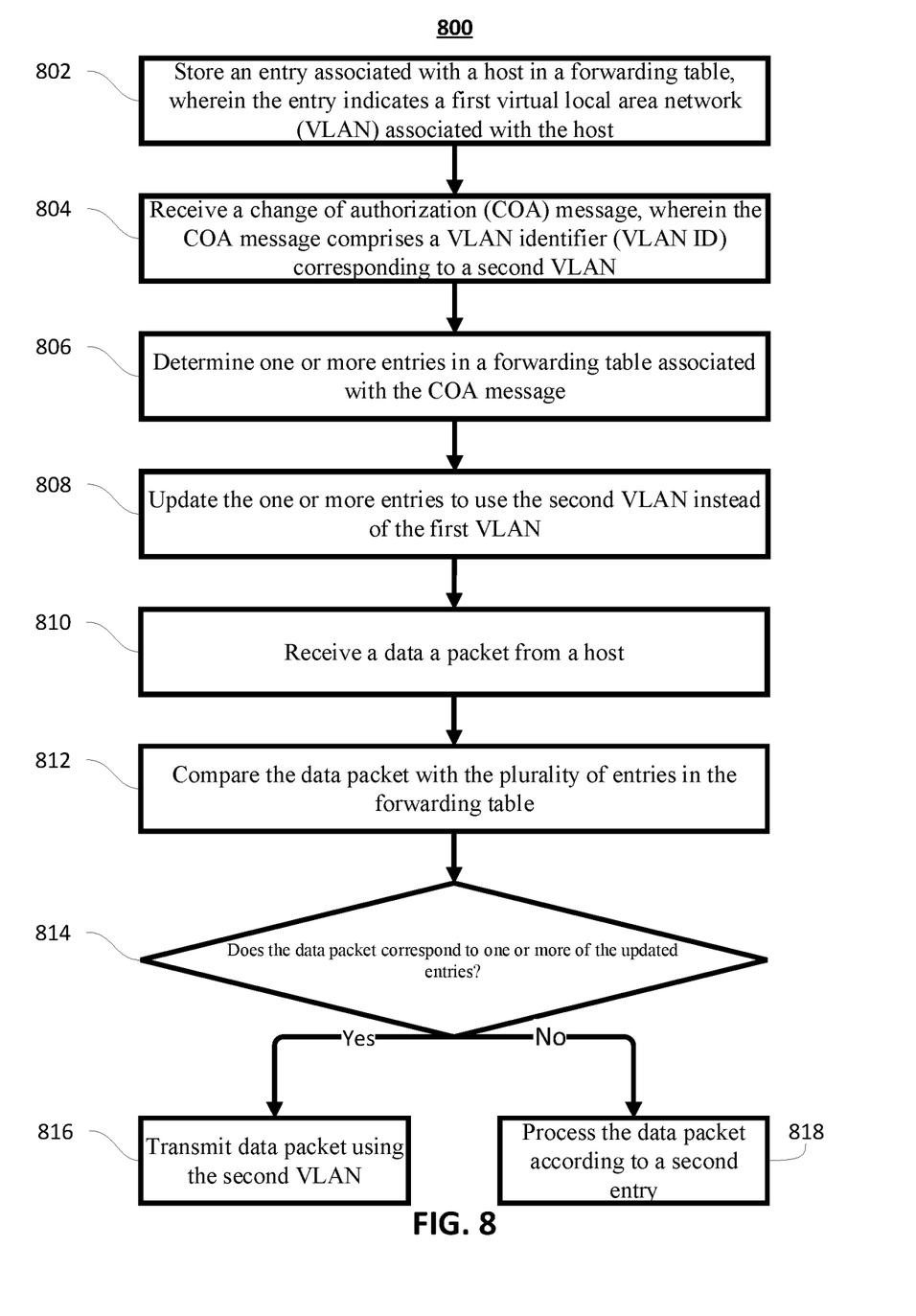
FIG. 8 is another flowchart of an illustrative process for transitioning a supplicant from one VLAN to another using a COA message, in accordance with some embodiments of the disclosure.

FIG. 8 is a flowchart of a detailed illustrative process for transitioning a supplicant from one VLAN to another using a COA message, in accordance with some embodiments of the present disclosure. In some embodiments, FIG. 8 comprises similar or the same steps as FIG. 7. In some embodiments, FIG. 8 describes specific implementations of one, some, or all of the steps described in FIG. 7. Process 800 may be performed by physical or virtual control circuitry, such as control circuitry 404 of device 400 (FIG. 4). For example, process 800 may be performed by control circuitries of a customer edge device and/or a provider edge device (e.g., PE 102 and/or CE 106. In some embodiments, some steps of process 800 may be performed by one of several devices.

At step 802, control circuitry stores an entry associated with a host in a forwarding table. In some embodiments, the forwarding table comprises table 200 of FIG. 2. In some embodiments, the entry associates the MAC address of the host with a VLAN ID, wherein the VLAN ID corresponds to a first VLAN. In some embodiments, the forwarding table (e.g., special-function TCAMs) has entries associating MAC addresses corresponding to one or more hosts with VLAN IDs. In some embodiments, the control circuitry uses MAC-based VLAN assignment to route data packets received from the host according to one or more entries in the forwarding table.

At step 804, control circuitry receives a COA message from an authentication server. In some embodiments, the COA message is the COA packet 300 of FIG. 3. In some embodiments, the COA message comprises a tunnel-private-group-ID, wherein the tunnel-private-group-ID indicates the host and a VLAN ID corresponding to a VLAN. In some embodiments, the COA message comprises a VLAN ID corresponding to a second VLAN, wherein the second VLAN is different from the first VLAN indicated in the entry associated with the host in step 802.

At step 806, control circuitry determines one or more entries in the forwarding table associated with the COA message. In some embodiments, the control circuitry compares the MAC address or addresses corresponding to a device or devices indicated in the COA message with the entries in the forwarding table. The control circuitry identifies each entry or entries in the forwarding table that correspond to a device or devices indicated in the COA message.

At step 808, control circuitry updates the one or more entries identified in step 806 according to the received COA message. In some embodiments, the identified entries are updated to map the MAC address or addresses from the first VLAN to the second VLAN in accordance with the received COA message.

At step 810, control circuitry receives a data packet from a host. In some embodiments, the data packet is untagged, and the control circuitry uses MAC-based VLAN assignment to assign the untagged data packet to a VLAN based on the source MAC address of the data packet. In some embodiments, the host is a laptop, desktop, smartphone, etc. In some embodiments, the control circuitry forwards data packets to and from the host.

At step 812, control circuitry compares the source MAC address of the data packet with entries in the forwarding table. For example, the control circuitry determines if the source MAC address corresponds to an entry in the forwarding table. In some embodiments, the forwarding table is located in storage 408, which is part of control circuitry 404 and is maintained by control circuitry 404.

At step 814, control circuitry determines if the source MAC address corresponds to an entry that was updated in step 808. If the source MAC address corresponds to an entry that was updated in step 808, the process 800 continues to step 816. If the source MAC address does not correspond to an entry that was updated in step 808, the process 800 continues to step 818.

At step 816, control circuitry transmits the first data packet using the second VLAN based on the updated entry. At step 818, control circuitry processes the data packet according to a second entry, wherein the second entry corresponds to the source MAC address of the data packet. In some embodiments, the second entry causes the control circuitry to transmit the data packet using the first VLAN. In some embodiments, the second entry causes the control circuitry to drop the data packet. In some embodiments, the second entry causes the control circuitry to transmit the data packet using the second VLAN. In some embodiments, the source MAC address of the data packet does not correspond to any entries in the forwarding table and the data packet is dropped.

The processes 500, 600, 700, and 800 described above are intended to be illustrative and not limiting. More generally, the above disclosure is meant to be illustrative and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

It will be apparent to those of ordinary skill in the art that methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

In some embodiments, a network device stores an entry associated with a host in a forwarding table of the network device, wherein the entry indicates a first VLAN associated with the host. In some embodiments, the network device further receives a change of authorization (COA) message associated with the host from an authentication server, wherein the COA message comprises a virtual local area network (VLAN) identifier (VLAN ID) corresponding to a second VLAN. In some embodiments, the network device further updates the entry associated with the host from the first VLAN to the second VLAN based on the VLAN ID received in the COA message. In some embodiments, the network device further receives a first data packet from the host and transmits the first data packet using the second VLAN based on the updated entry. In some embodiments, the entry associates a media access control (MAC) address of the host with an assigned VLAN. In some embodiments, the first data packet comprises a voice over internet protocol (VOIP) packet. In some embodiments, the host was authenticated by the authenticated server based on the MAC address of the host. In some embodiments, the network device further transmits a second data packet received from the host using the first VLAN prior to receiving the COA message, wherein the first VLAN is used based on the MAC address of the host.

In some embodiments, an apparatus comprises control circuitry and at least one memory including computer program code for one or more programs, the at least one memory and the computer program code configured to, with the control circuitry, cause the apparatus to store an entry associated with a host in a forwarding table of the network device, wherein the entry indicates a first VLAN associated with the host. In some embodiments, the apparatus is further caused to receive a change of authorization (COA) message associated with the host from an authentication server, wherein the COA message comprises a virtual local area network (VLAN) identifier (VLAN ID) corresponding to a second VLAN. In some embodiments, the apparatus is further caused to update the entry associated with the host from the first VLAN to the second VLAN based on the VLAN ID received in the COA message. In some embodiments, the apparatus is further caused to receive a first data packet from the host and transmit the first data packet using the second VLAN based on the updated entry. In some embodiments, the entry associates a media access control (MAC) address of the host with an assigned VLAN. In some embodiments, the first data packet comprises a voice over internet protocol (VOIP) packet. In some embodiments, the host was authenticated by the authenticated server based on the MAC address of the host. In some embodiments, the apparatus is further caused to transmit, a second data packet received from the host using the first VLAN prior to receiving the COA message, wherein the first VLAN is used based on the MAC address of the host.

In some embodiments, a non-transitory computer-readable medium having instructions encoded thereon that when executed by control circuitry cause the control circuitry to store an entry associated with a host in a forwarding table of the network device, wherein the entry indicates a first VLAN associated with the host. In some embodiments, the control circuitry is further caused to receive a change of authorization (COA) message associated with the host from an authentication server, wherein the COA message comprises a virtual local area network (VLAN) identifier (VLAN ID) corresponding to a second VLAN. In some embodiments, the control circuitry is further caused to update the entry associated with the host from the first VLAN to the second VLAN based on the VLAN ID received in the COA message. In some embodiments, the control circuitry is further caused to receive a first data packet from the host and transmit the first data packet using the second VLAN based on the updated entry. In some embodiments, the entry associates a media access control (MAC) address of the host with an assigned VLAN. In some embodiments, the first data packet comprises a voice over internet protocol (VOIP) packet. In some embodiments, the host was authenticated by the authenticated server based on the MAC address of the host. In some embodiments, the control circuitry is further caused to transmit, a second data packet received from the host using the first VLAN prior to receiving the COA message, wherein the first VLAN is used based on the MAC address of the host.

What is claimed is:

1. A method comprising:
   receiving, by an authentication server, an authentication request from a host, wherein the request includes a media access control (MAC) address of the host;
   authenticating, by the authentication server, the host based on the received MAC address;
   determining, by the authentication server, that the host needs to change from a first virtual local area network (VLAN) to a second VLAN;
   generating, by the authentication server, a change of authorization (COA) message associated with the host, wherein the COA message comprises a VLAN identifier (VLAN ID) corresponding to the second VLAN; and
   transmitting, by the authentication server, the COA message to a network device, wherein the network device is configured to route traffic to and from the host,
   wherein the network device comprises a forwarding table storing one or more entries associated with the host, said forwarding table associating a plurality of MAC addresses with one of a plurality of VLAN IDs,
   wherein the COA message causes one or more entries associated with the host in the forwarding table to be updated to the second VLAN.

2. The method of claim 1, wherein determining, by the authentication server, that the host needs to change from the first VLAN to the second VLAN in response to determining that the host needs to be quarantined.

3. The method of claim 1, wherein determining, by the authentication server, that the host needs to change from the first VLAN to the second VLAN in response to receiving an input from a network administrator.

4. The method of claim 1, wherein the COA message comprises a tunnel-private-group-ID, wherein the tunnel-private-group-ID comprises the VLAN ID.

5. The method of claim 1, wherein the network device routes traffic to and from the host using the second VLAN based on the VLAN ID received in the COA message.

6. The method of claim 1, wherein the network device routes voice over internet protocol (VOIP) packets to and from the host using the second VLAN.

7. The method of claim 1, wherein the network device routes traffic to and from the host using the first VLAN prior to receiving the COA message.

8. An apparatus comprising:
   control circuitry; and
   at least one memory including computer program code for one or more programs, the at least one memory and the computer program code configured to, with the control circuitry, cause the apparatus to perform at least the following:
   receive a request from a host, wherein the request includes a media access control (MAC) address of the host;

authenticate the host based on the received MAC address;

determine that the host needs to change from a first virtual local area network (VLAN) to a second VLAN;

generate a change of authorization (COA) message associated with the host, wherein the COA message comprises a VLAN identifier (VLAN ID) corresponding to the second VLAN; and transmit the COA message to a network device, wherein the network device routes traffic to and from the host wherein the network device comprises a forwarding table storing one or more entries associated with the host, said forwarding table associating a plurality of MAC addresses with one of a plurality of VLAN IDs, wherein the COA message causes one or more entries associated with the host in the forwarding table to be updated to the second VLAN.

9. The apparatus of claim 8, wherein the apparatus is further caused, when determining that the host needs to change from the first VLAN to the second VLAN, to determine that the host needs to be quarantined.

10. The apparatus of claim 8, wherein the apparatus is further caused, when determining that the host needs to change from the first VLAN to the second VLAN, to receive an input from a network administrator.

11. The apparatus of claim 8, wherein the COA message comprises a tunnel-private-group-ID, wherein the tunnel-private-group-ID comprises the VLAN ID.

12. The apparatus of claim 8, wherein the network device routes traffic to and from the host using the second VLAN based on the VLAN ID received in the COA message.

13. The apparatus of claim 8, wherein the network device routes voice over internet protocol (VOIP) packets to and from the host using the second VLAN.

14. The apparatus of claim 8, wherein the network device routes traffic to and from the host using the first VLAN prior to receiving the COA message.

15. A non-transitory computer-readable medium having instructions encoded thereon that when executed by control circuitry cause the control circuitry to:

receive a request from a host, wherein the request includes a media access control (MAC) address of the host;

authenticate the host based on the received MAC address;

determine that the host needs to change from a first virtual local area network (VLAN) to a second VLAN;

generate a change of authorization (COA) message associated with the host, wherein the COA message comprises a VLAN identifier (VLAN ID) corresponding to the second VLAN; and transmit the COA message to a network device, wherein the network device routes traffic to and from the host, wherein the network device comprises a forwarding table storing one or more entries associated with the host, said forwarding table associating a plurality of MAC addresses with one of a plurality of VLAN IDs, wherein the COA message causes one or more entries associated with the host in the forwarding table to be updated to the second VLAN.

16. The non-transitory computer-readable medium of claim 15, wherein the control circuitry is further caused, when determining that the host needs to change from the first VLAN to the second VLAN, to determine that the host needs to be quarantined.

17. The non-transitory computer-readable medium of claim 15, wherein the control circuitry is further caused, when determining that the host needs to change from the first VLAN to the second VLAN, to receive an input from a network administrator.

18. The non-transitory computer-readable medium of claim 15, wherein the COA message comprises a tunnel-private-group-ID, wherein the tunnel-private-group-ID comprises the VLAN ID.

19. The non-transitory computer-readable medium of claim 15, wherein the network device routes traffic to and from the host using the second VLAN based on the VLAN ID received in the COA message.

20. The non-transitory computer-readable medium of claim 15, wherein the network device routes traffic to and from the host using the first VLAN prior to receiving the COA message.

* * * * *